United States Patent
Nilsen et al.

(10) Patent No.: US 11,989,593 B2
(45) Date of Patent: May 21, 2024

(54) SYSTEMS AND METHODS FOR IDENTIFYING UNDERUTILIZED ELECTRONIC-DEVICE FEATURES

(71) Applicant: BOSE CORPORATION, Framingham, MA (US)

(72) Inventors: Thomas Nilsen, Auburn, MA (US); Kevin Andrew Ernst, Pleasant Grove, UT (US); Linshi Li, Wellesley, MA (US)

(73) Assignee: BOSE CORPORATION, Framingham, MA (US)

( * ) Notice: Subject to any disclaimer, the term of this patent is extended or adjusted under 35 U.S.C. 154(b) by 273 days.

(21) Appl. No.: 17/355,558

(22) Filed: Jun. 23, 2021

(65) Prior Publication Data
US 2022/0413930 A1 Dec. 29, 2022

(51) Int. Cl.
*G06F 9/46* (2006.01)
*G06F 9/48* (2006.01)
*G06F 9/50* (2006.01)

(52) U.S. Cl.
CPC .......... *G06F 9/5061* (2013.01); *G06F 9/4887* (2013.01); *G06F 9/5038* (2013.01)

(58) Field of Classification Search
CPC .................................................. G06F 9/5061
See application file for complete search history.

(56) References Cited

U.S. PATENT DOCUMENTS

2016/0380915 A1* 12/2016 Umapathy .............. G06F 9/451
709/226
2018/0102954 A1* 4/2018 Schubert ................. H04L 12/28

* cited by examiner

*Primary Examiner* — Gregory A Kessler
(74) *Attorney, Agent, or Firm* — Lando & Anastasi, LLP

(57) ABSTRACT

Aspects of the disclosure include a non-transitory computer-readable medium storing thereon sequences of computer-executable instructions for automatically identifying underutilized features of an electronic device, the sequences of computer-executable instructions including instructions that instruct at least one processor to determine whether at least one underutilized-feature trigger is satisfied, identify, based on determining that the at least one underutilized-feature trigger is satisfied, at least one underutilized feature of the electronic device, identify the at least one underutilized feature of the electronic device to a user of the electronic device, and store an indication of the identification of the at least one underutilized feature of the electronic device to the user.

20 Claims, 5 Drawing Sheets

SYSTEMS AND METHODS FOR IDENTIFYING UNDERUTILIZED ELECTRONIC-DEVICE FEATURES

BACKGROUND

1. Field of the Disclosure

At least one example in accordance with the present disclosure relates generally to automatically identifying underutilized electronic-device features.

2. Discussion of Related Art

Electronic devices, such as audio devices, televisions, smartphones, personal computers, automobiles, and so forth, often provide user-configurable features. Features may include functionality of one or more devices or components of an electronic device. The features may include user-configurable parameters, which a user may adjust.

SUMMARY

According to at least one aspect of the present disclosure, a non-transitory computer-readable medium storing thereon sequences of computer-executable instructions for automatically identifying underutilized features of an electronic device is provided, the sequences of computer-executable instructions including instructions that instruct at least one processor to determine whether at least one underutilized-feature trigger is satisfied, identify, based on determining that the at least one underutilized-feature trigger is satisfied, at least one underutilized feature of the electronic device, identify the at least one underutilized feature of the electronic device to a user of the electronic device, and store an indication of the identification of the at least one underutilized feature of the electronic device to the user.

In some examples, the instructions further instruct the at least one processor to determine whether to identify underutilized features prior to determining whether the at least one underutilized-feature trigger is satisfied. In at least one example, determining whether to identify the underutilized features includes determining whether the electronic device is in use by the user. In various examples, the at least one underutilized-feature trigger includes at least one of an event-based triggering condition or a time-based triggering condition being satisfied. In some examples, the event-based triggering condition includes the at least one underutilized feature being activated.

In at least one example, the time-based triggering condition includes a threshold period of time having elapsed from the at least one underutilized feature being added to the electronic device. In various examples, the instructions further instruct the at least one processor to determine, based on the indication of the identification of the at least one underutilized feature of the electronic device to the user, a number of times that the at least one underutilized feature of the electronic device has been identified to the user, and discontinue, responsive to determining that the number of times that the at least one underutilized feature of the electronic device has been identified to the user exceeds a threshold value, identifying the at least one underutilized feature of the electronic device to the user.

According to at least one aspect of the disclosure, a system for automatically identifying underutilized features of an electronic device is provided, the system comprising a user interface configured to output information to a user, and at least one controller configured to determine whether at least one underutilized-feature trigger is satisfied, identify, based on determining that the at least one underutilized-feature trigger is satisfied, at least one underutilized feature of the electronic device, identify, via the user interface, the at least one underutilized feature of the electronic device to a user of the electronic device, and store, in the storage, an indication of the identification of the at least one underutilized feature of the electronic device to the user.

In some examples, the system includes a communication interface configured to be communicatively coupled to the electronic device. In various examples, the at least one controller is further configured to provide, via the communication interface, information indicative of the at least one underutilized feature of the electronic device to the electronic device such that the electronic device identifies the at least one underutilized feature of the electronic device to the user. In at least one example, the at least one underutilized-feature trigger includes at least one of an event-based triggering condition or a time-based triggering condition being satisfied.

In some examples, the event-based triggering condition includes the at least one underutilized feature being activated. In various examples, the time-based triggering condition includes a threshold period of time having elapsed from the at least one underutilized feature being added to the electronic device. In at least one example, the at least one controller is further configured to determine, based on the indication of the identification of the at least one underutilized feature of the electronic device to the user, a number of times that the at least one underutilized feature of the electronic device has been identified to the user, and discontinue, responsive to determining that the number of times that the at least one underutilized feature of the electronic device has been identified to the user exceeds a threshold value, identifying the at least one underutilized feature of the electronic device to the user.

According to at least one aspect of the disclosure, a method of automatically identifying underutilized features of an electronic device is provided, the method comprising determining that at least one underutilized-feature trigger is satisfied, identifying, based on determining that the at least one underutilized-feature trigger is satisfied, at least one underutilized feature of the electronic device, identifying the at least one underutilized feature of the electronic device to a user of the electronic device, and storing an indication of the identification of the at least one underutilized feature of the electronic device to the user.

In some examples, the method includes providing information indicative of the at least one underutilized feature of the electronic device to the electronic device such that the electronic device identifies the at least one underutilized feature of the electronic device to the user. In at least one example, the at least one underutilized-feature trigger includes at least one of an event-based triggering condition or a time-based triggering condition being satisfied. In various examples, the event-based triggering condition includes the at least one underutilized feature being activated.

In some examples, the time-based triggering condition includes a threshold period of time having elapsed from the at least one underutilized feature being added to the electronic device. In at least one example, the method includes determining, based on the indication of the identification of the at least one underutilized feature of the electronic device to the user, a number of times that the at least one underutilized feature of the electronic device has been identified to the user, and discontinuing, responsive to determining that the number of times that the at least one underutilized feature of the electronic device has been identified to the user exceeds a threshold value, identifying the at least one underutilized feature of the electronic device to the user.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
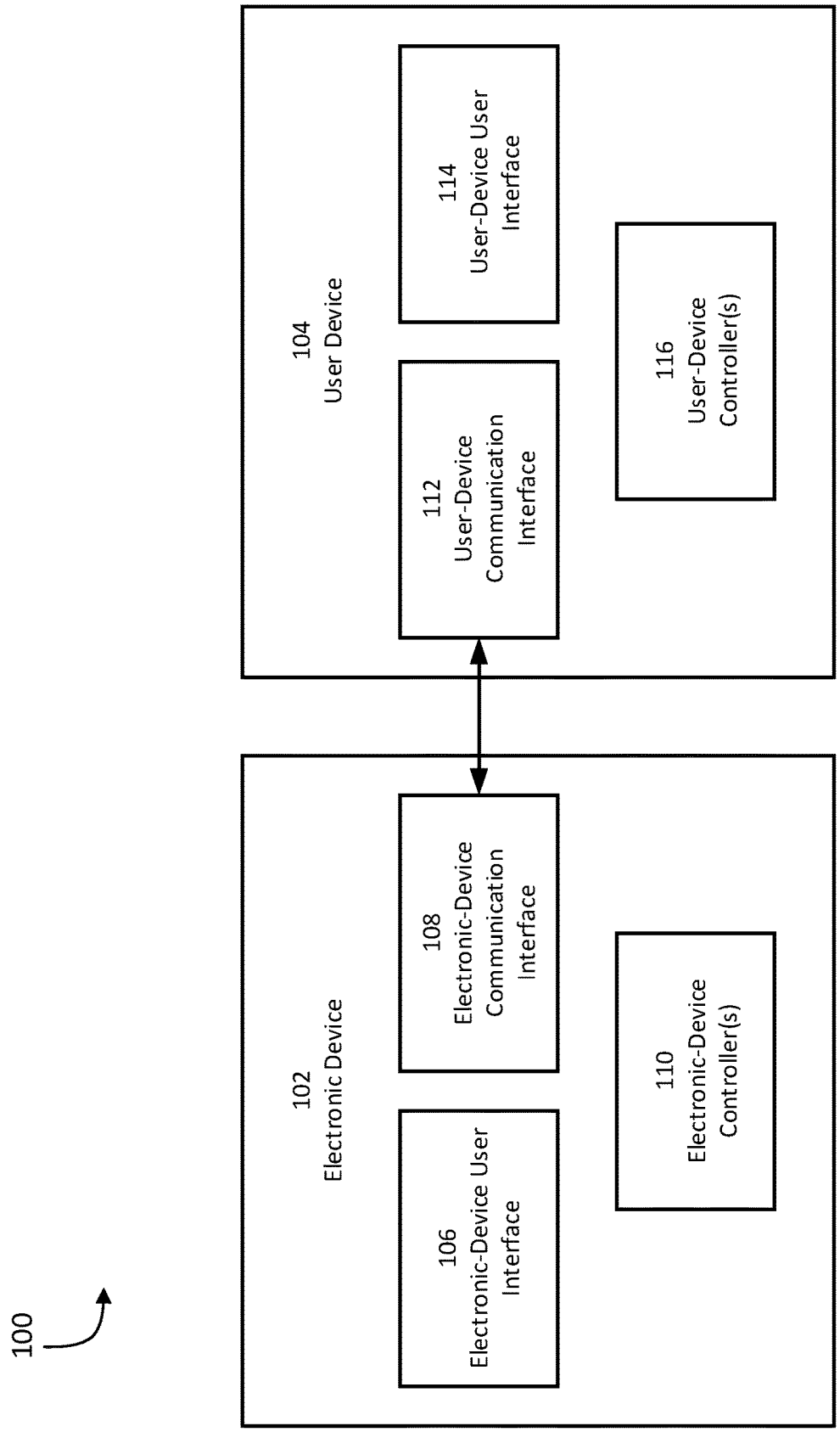
FIG. 1 illustrates a block diagram of a device-communication system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Electronic devices include a wide range of devices, such as audio devices, televisions, smartphones, personal computers, automobiles, and so forth. Audio devices may include various devices, such as headphones or earphones. A headphone or earphone may refer to a device that typically fits around, on, in, or near an ear and that radiates acoustic energy into or towards the ear canal. Headphones and earphones are sometimes referred to as earpieces, headsets, earbuds, or sport headphones, and can be wired or wireless. Certain wireless headphones play audio to a user based on information received from an audio source. An audio source may include a computing device (for example, a laptop computer, desktop computer, tablet, smartphone, or other electronic device) configured to communicate wireless signals encoding audio information to the wireless headphones.

An audio device may offer certain features to users. Users may access or control these features via a user interface, such as a capacitive touch interface. The user interface may receive an input from a user and take some action in response to the user input. For example, earphones may include a user interface that enables users to increase or decrease a playback volume, skip to another audio track, raise or lower an active noise reduction (ANR) setting, and so forth. In this example, the earphones may execute the corresponding functionality responsive to receiving the user input.

Users may not always be aware of the entire library of features available to them in interacting with an electronic device. Examples provided herein automatically identify underutilized features based on usage of the electronic device, and identify these electronic-device features to the user. The principles of this disclosure are applicable to a variety of electronic devices, including a variety of consumer electronic devices. For purposes of explanation only, examples are provided with respect to audio devices. However, it is to be appreciated that the principles of the disclosure are applicable to a wide variety of electronic devices. No limitation is implied by examples referring to audio devices.

Current electronic device systems, such as audio device systems, may not automatically identify underutilized features and provide a user interface that makes underutilized features known to a user. Such electronic device systems may operate inefficiently. Certain features of the electronic-device systems are not configured according to the preference of the user, yet the user is not aware that they are capable of configuring these features. This is a technical problem. An exemplary embodiment of an electronic device automatically identifies underutilized features and identifies the underutilized features to a user such that the electronic device may be optimized for the particular user. At least this foregoing combination of features comprises an electronic-device system that serves as a technical solution to the foregoing technical problem. This technical solution is not routine and is unconventional. This technical solution is a practical application of the electronic-device system design that solves the foregoing technical problem and constitutes an improvement in the technical field of electronic devices, such as audio devices, at least by enabling users to optimize an electronic device for the user's particular needs. For example, aspects of the disclosure recite a specific manner of automatically identifying underutilized features based on usage by a user which provides a specific improvement over prior systems, resulting in an improved user interface for electronic devices.

FIG. 1 illustrates a block diagram of a device-communication system 100 according to an example. The system 100 includes an electronic device 102 and a user device 104. The electronic device 102 may be any of a variety of electronic devices, including consumer electronic devices. Continuing with the foregoing examples for purposes of explanation, however, the electronic device 102 may be an audio device, such as a wearable audio device. The user device 104 may be a device that is communicatively coupled to the electronic device 102, such as a smartphone. The user device 104 may execute a smartphone application configured to interact with the electronic device 102.

The electronic device 102 includes an electronic-device user interface 106, an electronic-device communication interface 108, and one or more electronic-device controllers 110 ("electronic-device controller 110"). The user device 104 includes a user-device communication interface 112, a user-device user interface 114, and one or more user-device controllers 116 ("user-device controller 116"). The electronic-device communication interface 108 may be communicatively coupled to the user-device communication interface 112 via a wired and/or wireless connection. The electronic device 102 and the user device 104 may include additional components or modules not specifically identified above, such as one or more input-power charging connections, which are omitted for purposes of explanation.

The electronic-device user interface 106 includes one or more input and/or output components to interface with a user. Outputs of the electronic-device user interface 106 may include, for example, audio transducers configured to output acoustic signals (for example, music) to a user, vibrators configured to output vibration signals, light-emitting components configured to output visible electromagnetic radiation, or other components configured to output human-perceptible signals to a user. Inputs of the electronic-device user interface 106 may include capacitive touch sensors, dials, switches, buttons, or other components configured to receive inputs from a user. The user-device user interface 114 may be configured similarly for purposes of this disclosure.

The electronic-device communication interface 108 includes one or more wired or wireless communication interfaces configured to exchange (for example, send and/or receive) signals with one or more devices, such as the user device 104 via the user-device communication interface 112. For example, the electronic-device communication interface 108 may include a wireless communication interface, such as an antenna, configured to exchange wireless signals with the user device 104. The user-device communication interface 112 may be configured similarly for purposes of this disclosure.

The electronic-device controller 110 includes one or more controllers configured to control operation of the electronic device 102. The electronic-device controller 110 may be configured to perform one or more operations discussed herein. Using data stored in associated memory and/or storage, the electronic-device controller 110 may execute one or more instructions stored on one or more non-transitory computer-readable media that may result in manipulated data. In some examples, the electronic-device controller 110 may include one or more processors or other types of controllers. In one example, the electronic-device controller 110 is or includes at least one processor. In another example, the electronic-device controller 110 performs at least a portion of the operations discussed above using an application-specific integrated circuit (ASIC) tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. The user-device controller 116 may be configured similarly for purposes of this disclosure.

As discussed above, and for purposes of explanation, the electronic-device user interface 106 may be similar to the user-device user interface 114, the electronic-device communication interface 108 may be similar to the user-device communication interface 112, and the electronic-device controller 110 may be similar to the user-device controller 116. However, as discussed above, the electronic device 102 and the user device 104 may be implemented differently. For example, whereas the user device 104 may be implemented as a smartphone, the electronic device 102 may be implemented as any of various audio devices.

Example wireless audio devices, which may be examples of the electronic device 102, will be described with respect to FIGS. 2-4B. However, it is to be appreciated that FIGS. 2-4B illustrate only some examples of audio devices. Other audio devices are within the scope of the disclosure. Moreover, as discussed above, devices other than audio devices are within the scope of the disclosure.

Figure 2:
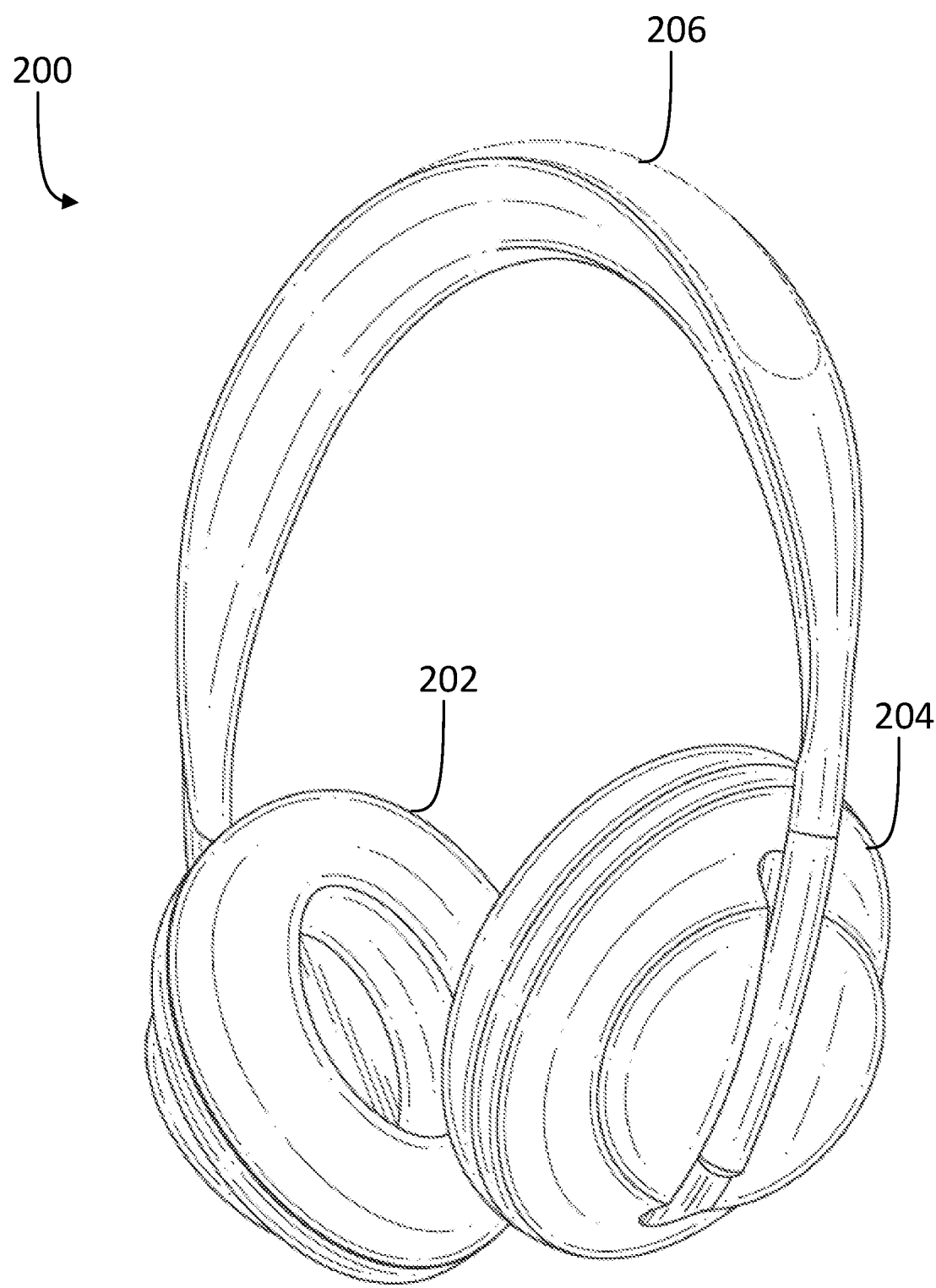
FIG. 2 illustrates a perspective view of headphones according to an example.

FIG. 2 illustrates a perspective view of headphones 200 according to an example. The headphones 200 include a first housing 202, a second housing 204, and a connector 206. In one example, the first housing 202 may be configured to be placed over one of a user's ears, and the second housing 204 may be configured to be placed over another of the user's ears. The first housing 202 and the second housing 204 may each respectively include an acoustic driver configured to transmit acoustic energy to the user. The connector 206 may provide an electrical and/or mechanical connection between the first housing 202 and the second housing 204 and facilitate coupling of the headphones 200 to the user's ears and/or head.

Figure 3:
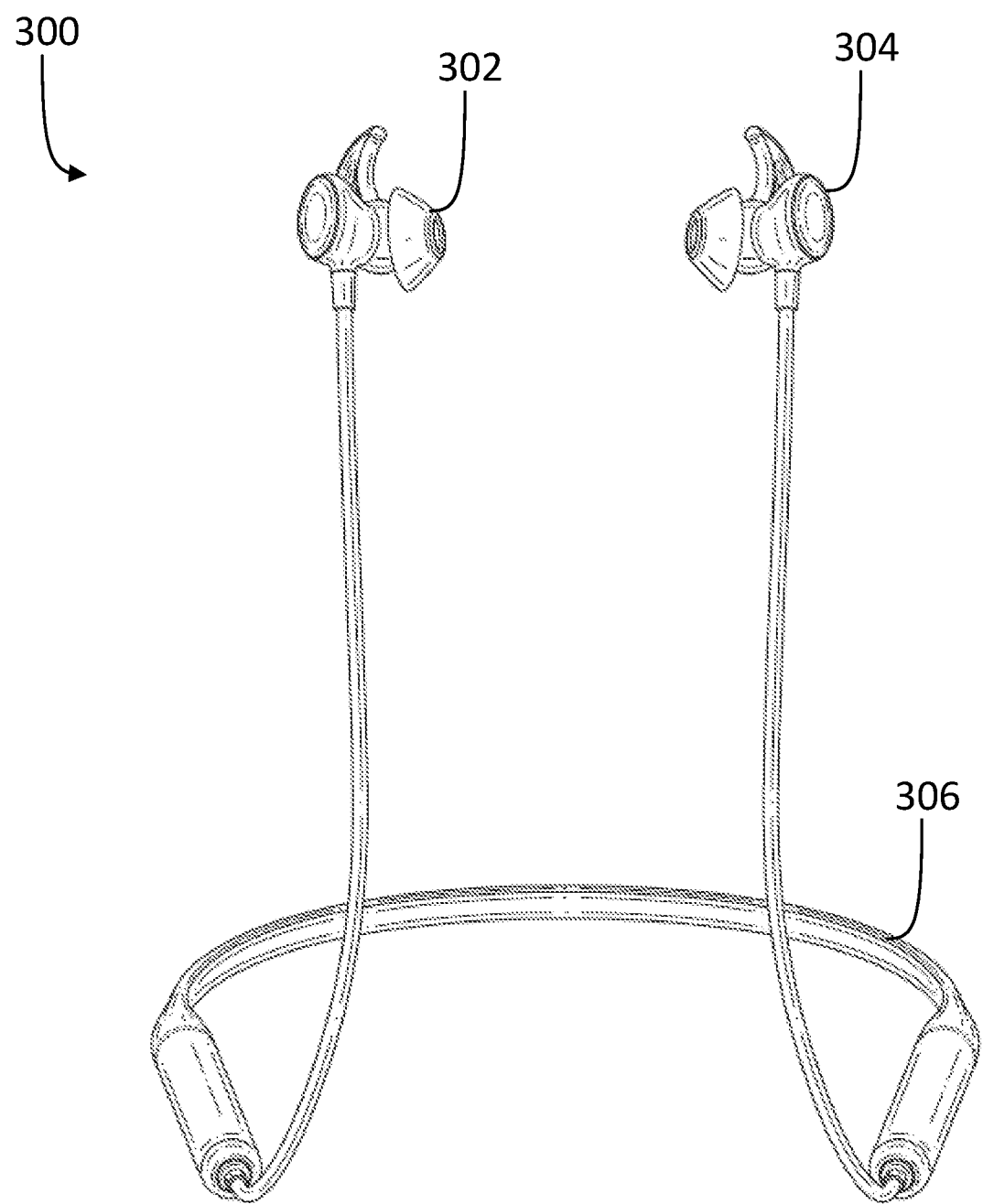
FIG. 3 illustrates a perspective view of headphones according to another example.

FIG. 3 illustrates a perspective view of headphones 300 according to another example. The headphones 300 include a first housing 302, a second housing 304, and a connector 306. In one example, the first housing 302 may be configured to be inserted into one of a user's ear canals or pinne, and the second housing 304 may be configured to be inserted into another of the user's ear canals or pinne. The first housing 302 and the second housing 304 may each respectively include an acoustic driver configured to provide acoustic energy to the user. The connector 306 may provide an electrical and/or mechanical connection between the first housing 302 and the second housing 304. Although the connector 306 may be implemented in a wired configuration, the headphones 300 may be referred to as a wireless audio device in certain examples, such as where the headphones maintain a wireless connection with an audio source.

Figure 4A:
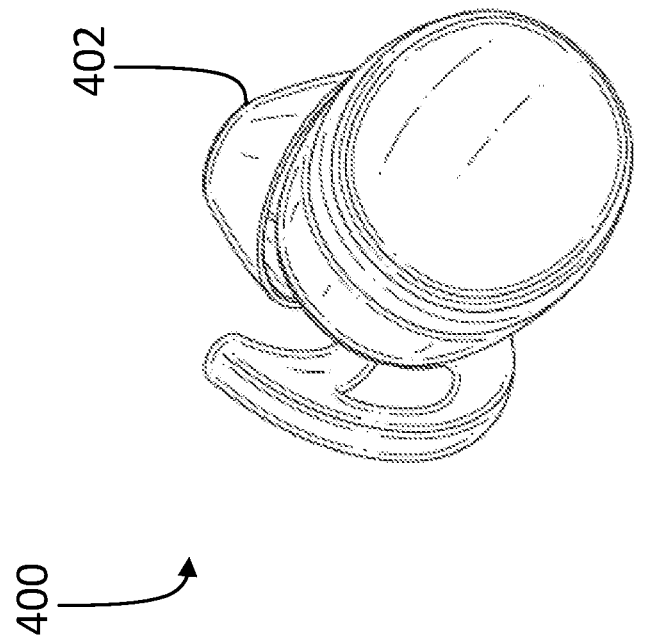
FIG. 4A illustrates a perspective view of an earpiece according to an example.
Figure 4B:
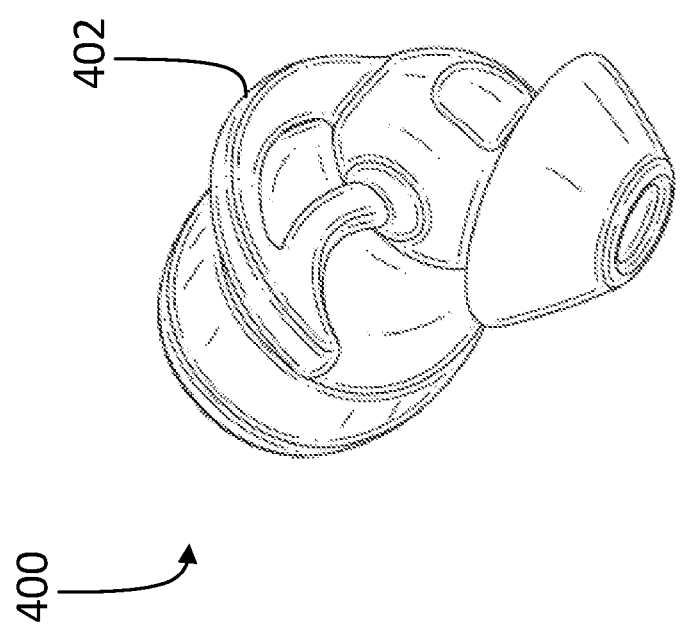
FIG. 4B illustrates another perspective view of the earpiece according to an example.

FIG. 4A illustrates a perspective view of an earpiece 400 according to another example. FIG. 4B illustrates another perspective view of the earpiece 400 according to an example. The earpiece 400 includes a housing 402. In one example, the housing 402 may be configured to be inserted into one of a user's ear canals or pinne. The housing 402 may include an acoustic driver configured to provide acoustic energy to the user. The earpiece 400 may be implemented in conjunction with another, similar, headphone configured to be inserted into another of the user's ear canals or pinne.

In some examples, the earpiece 400 and the similar headphone may communicate wirelessly with one another.

Still other audio devices, including wearable audio devices, are contemplated by the disclosure. For example, other example audio devices may include headphones, earphones, earpieces, headsets, earbuds, sport headphones, audio eyeglasses, or other devices configured to output acoustic signals.

As discussed above, the electronic device 102 may offer a variety of features to users. Features may include any of various discrete functions of the electronic device 102. These features may be activated by a user, and may be adjustable. For example, these features may be adjustable in a binary or analog fashion. Adjusting binary features may include activating or deactivating a feature, such as by disabling ANR entirely. Adjusting analog features may include increasing or decreasing an intensity of a feature having more than two settings (for example, ON or OFF), such as by incrementally increasing a volume.

Although a wide variety of features are contemplated, example features may include changing a volume setting, selecting a new audio track, adjusting an ANR setting, answering a phone call, denying a phone call, pausing or resuming audio playback, automatically decreasing an audio volume when a user of the electronic device 102 is speaking, automatically reducing or disabling ANR when important external audio information (for example, a doorbell sound, a person speaking to the user of the electronic device 102, and so forth) is presented to the user of the electronic device 102, automatically switching between microphones (for example, internal or external microphones) in the presence of external stimuli such as high winds, automatically adjusting noise cancellation responsive to external stimuli, and so forth.

In one example, the user may activate or adjust these features (for example, to enable or disable a feature, or to configure an intensity of the feature) by providing user inputs to the electronic device 102 itself, such as via the electronic-device user interface 106. In another example, the user may activate or adjust these features by providing user inputs to the user device 104, such as via the user-device user interface 114. The devices 102, 104 may, in turn, provide one or more adjustment signals to one another via the communication interfaces 108, 112 to execute the activation and/or adjustment of the features.

As discussed above, however, users may not be aware of every feature available from the electronic device 102. Accordingly, either or both of the devices 102, 104 may notify a user of underutilized features the user may not be familiar with. For example, notifications may be provided with respect to features that a user may not realize the user can control. Example processes to identify such features are provided below.

Figure 5:
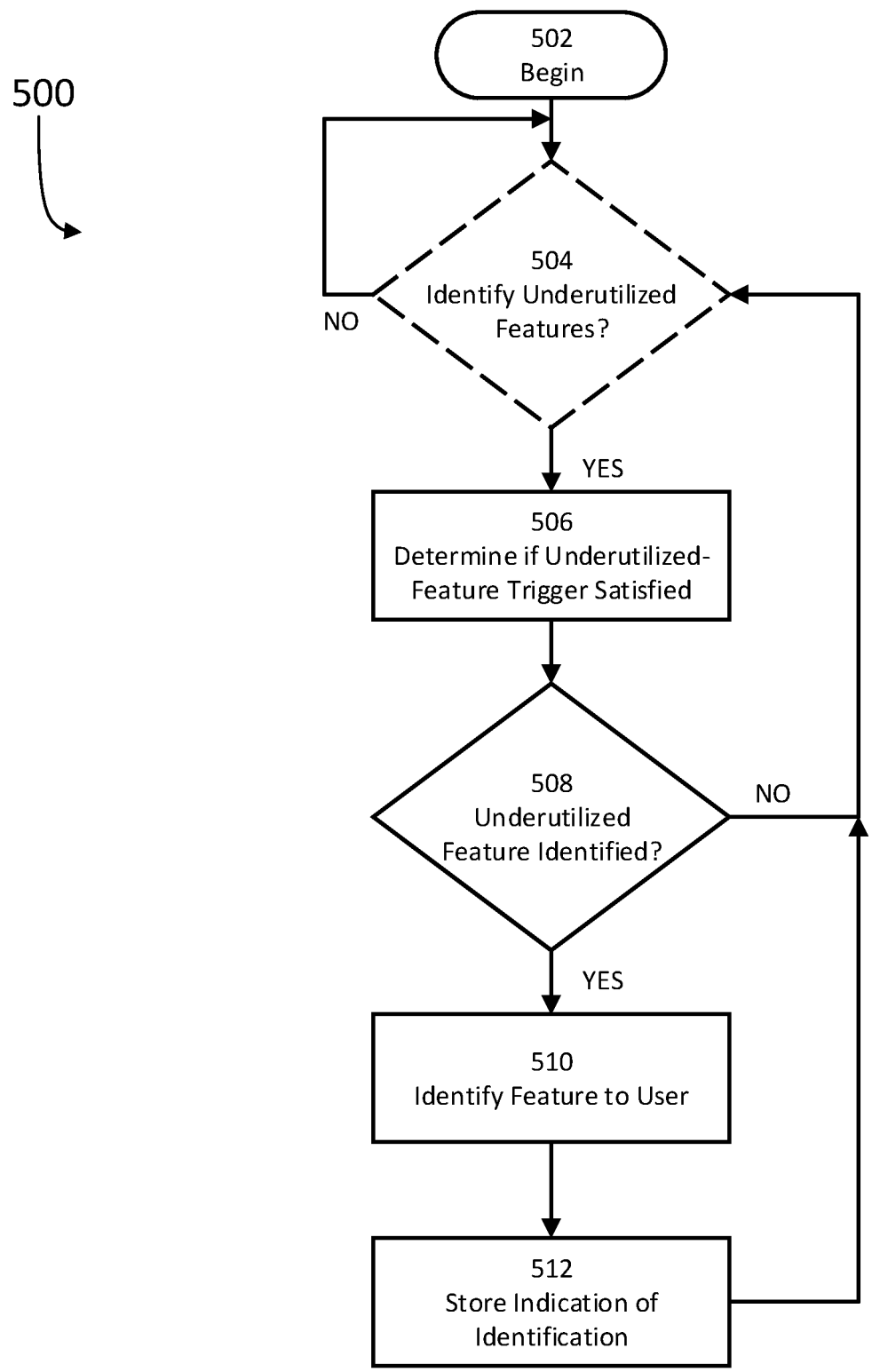
FIG. 5 illustrates a process of identifying underutilized electronic-device features according to an example.

FIG. 5 illustrates a process 500 of identifying underutilized electronic-device features according to an example. Underutilized features include features of the electronic device 102 that a user may not be aware of, or may not utilize to a full extent. A feature may be considered underutilized even if the user is using the feature, such as if the feature is being used in a non-optimal manner. For example, if a feature is being used more aggressively than is necessary (such as by turning an ANR feature up significantly more than is necessary for the user's normal operation of the electronic device 102), the feature may still be considered "underutilized" even though the feature is used aggressively. The process 500 may be executed by the electronic device 102, the user device 104, or a combination of both. For example, the process may be executed by the electronic-device controller 110 and/or the user-device controller 116.

At act 502, the process 500 begins.

At optional act 504, a determination is made as to whether underutilized features are to be identified. In examples in which optional act 504 is executed, underutilized features may only be identified in certain conditions. If these conditions are not met (504 NO), then the process 500 repeatedly executes act 504 until the conditions are met (504 YES). Various conditions may be implemented at act 504, and non-limiting examples are provided for purposes of explanation only. For example, such conditions may include determining whether the electronic device 102 is powered on and/or in use. If the electronic device 102 is not powered on and/or is not in use (504 NO), then the process 500 may return to act 504 and repeatedly execute act 504 until the electronic device 102 is powered on or is in use (504 YES). The process 500 then continues to act 506.

In another example, such conditions may include determining whether a user of the electronic device 102 has disabled the electronic device 102 from identifying underutilized features. For example, a user may configure a setting to instruct the electronic device 102 not to identify underutilized features or to bring underutilized features to the user's attention. If the electronic device 102 is disabled from identifying underutilized features (504 NO), then the process 500 may return to act 504 and repeatedly execute act 504 until the user re-enables the identification of underutilized features (504 YES). The process 500 then continues to act 506. In other examples, other conditions may be implemented at act 504. In still other examples, optional act 504 may not be executed, and the process 500 may continue from act 502 directly to act 506.

At act 506, a determination is made as to whether an underutilized-feature trigger is satisfied. An underutilized-feature trigger may include a condition or set of conditions that, if satisfied, indicate that a feature is underutilized. The underutilized feature may then be brought to the user's attention such that the user is aware of the feature. An underutilized-feature trigger may include at least one event-based triggering condition, at least one time-based triggering condition, at least one barring condition, or a combination of the foregoing. In alternate examples, an underutilized-feature trigger may include at least one event-based triggering condition and at least one time-based triggering condition, but the underutilized-feature trigger may not result in a user being informed of the underutilized feature if a barring condition is met.

An event-based triggering condition may include any set of one or more conditions satisfied by the occurrence or non-occurrence of an event. For example, an event-based triggering condition may include the feature itself being activated. By way of example, an audio-ducking feature may automatically reduce a volume of audio playback by the electronic-device user interface 106 responsive to the electronic device 102 determining that the user of the electronic device 102 is speaking with someone. The event-based triggering condition may be that the audio-ducking feature is activated. As discussed in greater detail below, after the audio-ducking feature is activated, the user may be made aware of the audio-ducking feature such that the user can re-configure or deactivate the audio-ducking feature in the future if the user so desires.

In another example, an event-based triggering condition may include the feature being added or updated. Continuing with the foregoing example, if the electronic device 102 is updated to newly include the audio-ducking feature, then the event-based triggering condition may be that the electronic device 102 is newly capable of executing the audio-ducking feature. As discussed in greater detail below, the user may then be made aware of the audio-ducking feature such that the user can re-configure or deactivate the audio-ducking feature if the user so desires.

In another example, an event-based triggering condition may include an event that would activate a disabled feature were the feature not disabled. Continuing with the foregoing example, the event-based triggering condition may be satisfied if the audio-ducking feature is disabled while the electronic device 102 would normally activate the audio-ducking feature (for example, because the user is engaged in conversation). As discussed in greater detail below, the user may then be made aware of the audio-ducking feature such that the user can activate the audio-ducking feature if the user so desires.

In other examples, other event-based triggering conditions may be implemented.

A time-based triggering condition may include any set of one or more conditions satisfied by an amount of time that has elapsed. For example, a time-based triggering condition may include a threshold period of time elapsing since a feature was updated or newly added. Continuing with the foregoing example, if the audio-ducking feature is adjusted or newly added, a timer may be initiated. If the user does not activate or adjust the feature before a threshold period of time elapses, then the time-based triggering condition may be satisfied.

In another example, a time-based triggering condition may include a threshold period of time elapsing since the user was last notified of an underutilized feature, as discussed below with respect to act 510. For example, a user may only be notified of underutilized features every two days in one example. When the user is notified of an underutilized feature, a timer may be initiated. The time-based triggering condition may include two days elapsing after the user was notified of the underutilized feature.

In other examples, other time-based triggering conditions may be implemented.

As discussed above, the underutilized-feature trigger may include a combination of conditions being satisfied. In some examples, an underutilized-feature trigger may include both an event-based triggering condition and a time-based triggering condition. Continuing with an audio-ducking example, the event-based triggering condition may include the audio-ducking feature being activated. The time-based triggering condition may include a threshold period of time elapsing since the user was last notified of an underutilized feature. Accordingly, in one example, the underutilized-feature trigger may be satisfied only if the audio-ducking feature is activated and the user has not been notified of any underutilized features within the past two days. Those skilled in the art will recognize that a wide range of combinations of conditions may be within the scope of the disclosure.

In some examples, the underutilized-feature trigger may further include the non-occurrence of at least one barring condition. A barring condition may include any condition that, if satisfied, removes a feature from classification as an underutilized feature such that the feature is not, or is no longer, brought to a user's attention. For example, if a certain feature has been previously adjusted, activated, deactivated, or otherwise interacted with by a user, then the feature may no longer be considered an underutilized feature. In another example, if a certain feature has been identified as an underutilized feature and brought to the user's attention more than a certain number of times (for example, one time, three times, four times, ten times, and so forth), then the feature may no longer be considered an underutilized feature. In yet another example, if a user has specifically requested that no further notifications be provided with respect to the underutilized feature, then the feature may not be considered an underutilized feature. In various examples, barring conditions may be implemented in addition to event- and/or time-based triggering conditions.

At act 508, a determination is made as to whether any underutilized features are identified. For example, if no underutilized-feature trigger is satisfied at act 506, then a determination may be made that no underutilized feature has been identified (508 NO). The process 500 then returns to optional act 504 or, if optional act 504 is not executed, to act 506. Otherwise, if an underutilized-feature trigger is satisfied at act 506, then a determination may be made that an underutilized feature has been identified (508 YES). The process 500 then continues to act 510.

At act 510, at least one underutilized feature is identified to the user. Identifying the at least one underutilized feature to the user may informing the user of the existence, purpose, and/or functionality of the at least one underutilized feature, and/or informing the user of how to activate, deactivate, or otherwise adjust the feature. In one example, act 510 may include visually displaying information about the at least one underutilized feature to a user via the user-device user interface 114, audibly outputting information to a user via the user-device user interface 114, audibly outputting information to a user via the electronic-device user interface 106, a combination of the foregoing, or another manner of identifying the at least one underutilized feature to the user.

For example, where an underutilized feature is the audio-ducking feature, act 510 may include informing the user about the existence of the feature, informing the user why and how the feature functions, and instructing the user as to how to adjust, activate, and/or deactivate the feature. This information may be provided via audio signals, visual signals, or a combination thereof.

In some examples, a user may interact with an identification of the at least one underutilized feature. For example, the user may select an option to no longer receive notifications about the at least one underutilized feature. As discussed above, such a selection may constitute a barring condition such that the at least one underutilized feature will no longer be identified to the user in the future. In another example, the user may adjust, activate, deactivate, or otherwise interact with the at least one underutilized feature responsive to receiving the notification. As discussed above, such an interaction may constitute a barring condition such that the at least one underutilized feature will no longer be identified to the user in the future.

In various examples, multiple underutilized features may be identified at act 508, but fewer than all of the underutilized features may be identified to a user at act 510. For example, no more than a threshold number of underutilized features (for example, one feature, two features, four features, and so forth) may be identified to a user at any one time. If more than the threshold number of underutilized features are identified at act 508, a subset of these features may be identified to a user at act 510. In some examples, the subset may be identified based on a metric such as a perceived usefulness of the identification to the user. For example, if a first feature has not been previously identified to the user and a second feature has been previously identified to the user, then the first feature may be identified to the user at act 510 and the second feature may not be. In other examples, the subset may be randomly selected. In still other examples, no such threshold number is implemented, and all of the underutilized features identified at act 508 are identified to the user at act 510.

At act 512, an indication of the identification to the user is stored. The indication may include metadata of the identification of the at least one underutilized feature. The indication may be stored in memory and/or storage accessible to the electronic-device controller 110 and/or the user-device controller 116. The indication may denote a time that a feature was identified to a user, a number of times that the feature has been identified to the user, and/or other metadata. As indicated above, in some examples, features may be identified to a user only a certain number of times (for example, four times), after which no further notifications will be provided to a user about that particular feature. Moreover, in some examples, a feature may not be identified to a user above a certain frequency. For example, a certain feature may only be identified to a user every two days or more. The process 500 then returns to optional act 504 or, if optional act 504 is not included, to act 506.

An example of the process 500 is provided for purposes of explanation only, and is not intended to be limiting. In this non-limiting example, the electronic device 102 may be an earpiece or pair of earpieces, and the user device 104 may be a smartphone communicatively coupled to the electronic device 102. The user device 104 may repeatedly (for example, periodically, aperiodically, continuously, and so forth) receive information from the electronic device 102 via the interfaces 108, 112. The information indicative of, amongst other information, whether a feature has been interacted with by a user, such as user-input information, operating information, and so forth.

At optional act 504, the user-device controller 116 may determine whether to identify underutilized features. For example, the user-device controller 116 may determine whether the electronic device 102 is powered on and is in use by a user based on information received from the electronic device 102. If so (504 YES), the process 500 continues to act 506.

At act 506, the user-device controller 116 may determine whether an underutilized-feature trigger is satisfied. Although act 506 may include determining whether any of a large number of underutilized-feature triggers are satisfied, one example is provided of purposes of explanation. For example, one example underutilized-feature trigger may include an event-based triggering condition, a time-based triggering condition, and a barring condition. The event-based triggering condition may include a feature, which may be a skip-track feature for purposes of example being newly added. The skip-track feature skips an audio track when activated, and is activated by a user double-tapping a capacitive touch sensor of the electronic-device user interface 106. The time-based triggering condition may include a period of time, which may be one week for purposes of example, having elapsed since the skip-track feature was newly added. The barring condition may include the user having already activated the skip-track feature.

In one example, more than one week has elapsed since the skip-track feature was added to the electronic device 102, yet the user has not activated the skip-track feature. Accordingly, each of the conditions of the underutilized-feature trigger is satisfied in this example. Had any of the conditions not been satisfied (for example, only five days having elapsed since the skip-track feature was added to the electronic device 102), then the underutilized-feature trigger may not have been satisfied.

At act 508, the user-device controller 116 may determine whether any underutilized-feature trigger has been satisfied at act 506. For example, if more than one week has elapsed since the skip-track feature was added to the electronic device 102, yet the user has not activated the skip-track feature, then the underutilized-feature trigger is satisfied (508 YES) and the process 500 continues to act 510. Otherwise, if the underutilized-feature trigger is not satisfied (508 NO), then the process 500 returns to act 504.

At act 510, the user-device controller 116 may identify the skip-track feature to the user. For example, the user-device controller 116 may provide a visual and/or audible notification to the user via the user-device user interface 114. The user-device controller 116 may alternately or in addition send a signal to the electronic device 102 via the interfaces 108, 112 indicative of the skip-track feature, and the electronic device 102 may identify the skip-track feature to the user. For example, the electronic-device controller 110 may control an audio-output component of the electronic-device user interface 106 to output an audio signal describing the skip-track feature to the user.

The user may or not may interact with the notification of the skip-track feature. For example, the user may receive a visual notification on a display of the user-device user interface 114, such as a smartphone notification. The user may dismiss or ignore the notification in some examples. In other examples, the user may interact with the notification to learn more about the skip-track feature, or may select a prompt to no longer receive notifications about the skip-track feature. If the user interacts with the notification, activates the skip-track feature, or selects the prompt to no longer receive notifications about the skip-track feature, then no further notifications about the skip-track feature may be provided to the user. Otherwise, in some examples additional notifications about the skip-track feature may be provided to the user.

At act 512, the user-device controller 116 stores an indication of the identification of the skip-track feature in storage and/or memory, which may be local and/or remote. For example, the user-device controller 116 may indicate that the user has been notified about the skip-track feature one time at a certain timestamp. At a subsequent point in time, the user-device controller 116 may provide additional notifications to the user. If the user ignores or dismisses the notifications about the skip-track feature more than a certain number of times (for example, four times), then the user-device controller 116 may determine that additional notifications are not helpful or not wanted, and will discontinue providing notifications about the skip-track feature to the user.

Accordingly, examples have been provided in which underutilized features of an electronic device are identified and made known to a user. Underutilized features may include features that are used non-optimally, such as features that a user may not be aware of or may not realize are configurable by the user. Electronic devices may include any of a wide variety of electronic devices, including but not limited to audio devices. As discussed above, the foregoing combination of features comprises an electronic-device system that serves as a technical solution to the foregoing technical problem. This technical solution is not routine and is unconventional. This technical solution is a practical application of the electronic-device system design that solves the foregoing technical problem and constitutes an improvement in the technical field of electronic devices, such as audio devices, at least by enabling users to optimize an electronic device for the user's particular needs. For example, aspects of the disclosure recite a specific manner of automatically identifying underutilized features based on usage by a user which provides a specific improvement over prior systems, resulting in an improved user interface for electronic devices.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A non-transitory computer-readable medium storing thereon sequences of computer-executable instructions for automatically identifying underutilized features of an electronic device, the sequences of computer-executable instructions including instructions that instruct at least one processor to:
   determine whether one or more feature-activation conditions to activate at least one underutilized feature are met;
   activate the at least one underutilized feature responsive to determining that the one or more feature-activation conditions are met;
   determine whether at least one underutilized-feature trigger is satisfied, wherein the at least one underutilized-feature trigger includes the at least one underutilized feature being activated;
   identify, responsive to determining that the at least one underutilized feature has been activated, the at least one underutilized feature of the electronic device as being underutilized;
   identify the at least one underutilized feature of the electronic device to a user of the electronic device; and
   store an indication of the identification of the at least one underutilized feature of the electronic device to the user.

2. The non-transitory computer-readable medium of claim 1, wherein the instructions further instruct the at least one processor to determine whether to identify underutilized features prior to determining whether the at least one underutilized-feature trigger is satisfied.

3. The non-transitory computer-readable medium of claim 2, wherein determining whether to identify the underutilized features includes determining whether the electronic device is in use by the user.

4. The non-transitory computer-readable medium of claim 1, wherein the at least one underutilized-feature trigger includes at least one of an event-based triggering condition or a time-based triggering condition being satisfied.

5. The non-transitory computer-readable medium of claim 4, wherein the time-based triggering condition includes a threshold period of time having elapsed from the at least one underutilized feature being added to the electronic device.

6. The non-transitory computer-readable medium of claim 1, wherein the instructions further instruct the at least one processor to:
   determine, based on the indication of the identification of the at least one underutilized feature of the electronic device to the user, a number of times that the at least one underutilized feature of the electronic device has been identified to the user; and
   discontinue, responsive to determining that the number of times that the at least one underutilized feature of the electronic device has been identified to the user exceeds a threshold value, identifying the at least one underutilized feature of the electronic device to the user.

7. The non-transitory computer-readable medium of claim 4, wherein the at least one underutilized-feature trigger includes the event-based triggering condition and the time-based triggering condition, and wherein the at least one underutilized-feature trigger is satisfied in response to either the event-based triggering condition or the time-based triggering condition being satisfied.

8. The non-transitory computer-readable medium of claim 4, wherein the at least one underutilized-feature trigger includes the event-based triggering condition and the time-based triggering condition, and wherein the at least one underutilized-feature trigger is satisfied in response to both the event-based triggering condition and the time-based triggering condition being satisfied.

9. A system for automatically identifying underutilized features of an electronic device, the system comprising:
   a user interface configured to output information to a user; and
   at least one controller including at least one processor coupled to at least one memory and/or storage, the at least one controller being configured to:
      determine whether one or more feature-activation conditions to activate at least one underutilized feature are met;
      activate the at least one underutilized feature responsive to determining that the one or more feature-activation conditions are met;
      determine whether at least one underutilized-feature trigger is satisfied, wherein the at least one underutilized-feature trigger includes the at least one underutilized feature being activated;
      identify, responsive to determining that the at least one underutilized feature has been activated, the at least one underutilized feature of the electronic device as being underutilized;
      identify, via the user interface, the at least one underutilized feature of the electronic device to a user of the electronic device; and
      store, in the storage, an indication of the identification of the at least one underutilized feature of the electronic device to the user.

10. The system of claim 9, further comprising a communication interface configured to be communicatively coupled to the electronic device.

11. The system of claim 10, wherein the at least one controller is further configured to provide, via the communication interface, information indicative of the at least one underutilized feature of the electronic device to the electronic device such that the electronic device identifies the at least one underutilized feature of the electronic device to the user.

12. The system of claim 9, wherein the at least one underutilized-feature trigger includes at least one of an event-based triggering condition or a time-based triggering condition being satisfied.

13. The system of claim 12, wherein the time-based triggering condition includes a threshold period of time having elapsed from the at least one underutilized feature being added to the electronic device.

14. The system of claim 9, wherein the at least one controller is further configured to:

determine, based on the indication of the identification of the at least one underutilized feature of the electronic device to the user, a number of times that the at least one underutilized feature of the electronic device has been identified to the user; and discontinue, responsive to determining that the number of times that the at least one underutilized feature of the electronic device has been identified to the user exceeds a threshold value, identifying the at least one underutilized feature of the electronic device to the user.

15. A method of automatically identifying underutilized features of an electronic device, the method comprising:

determining whether one or more feature-activation conditions to activate at least one underutilized feature are met;

activating the at least one underutilized feature responsive to determining that the one or more feature-activation conditions are met;

determining that at least one underutilized-feature trigger is satisfied, wherein the at least one underutilized-feature trigger includes the at least one underutilized feature being activated;

identifying, responsive to determining that the at least one underutilized feature has been activated, the at least one underutilized feature of the electronic device as being underutilized;

identifying the at least one underutilized feature of the electronic device to a user of the electronic device; and storing an indication of the identification of the at least one underutilized feature of the electronic device to the user.

16. The method of claim 15, further comprising providing information indicative of the at least one underutilized feature of the electronic device to the electronic device such that the electronic device identifies the at least one underutilized feature of the electronic device to the user.

17. The method of claim 15, wherein the at least one underutilized-feature trigger includes at least one of an event-based triggering condition or a time-based triggering condition being satisfied.

18. The method of claim 17, wherein the time-based triggering condition includes a threshold period of time having elapsed from the at least one underutilized feature being added to the electronic device.

19. The method of claim 15, further comprising:

determining, based on the indication of the identification of the at least one underutilized feature of the electronic device to the user, a number of times that the at least one underutilized feature of the electronic device has been identified to the user; and discontinuing, responsive to determining that the number of times that the at least one underutilized feature of the electronic device has been identified to the user exceeds a threshold value, identifying the at least one underutilized feature of the electronic device to the user.

20. The method of claim 17, wherein the at least one underutilized-feature trigger includes the event-based triggering condition and the time-based triggering condition, and wherein the at least one underutilized-feature trigger is satisfied in response to both the event-based triggering condition and the time-based triggering condition being satisfied.

* * * * *